Figure 1:
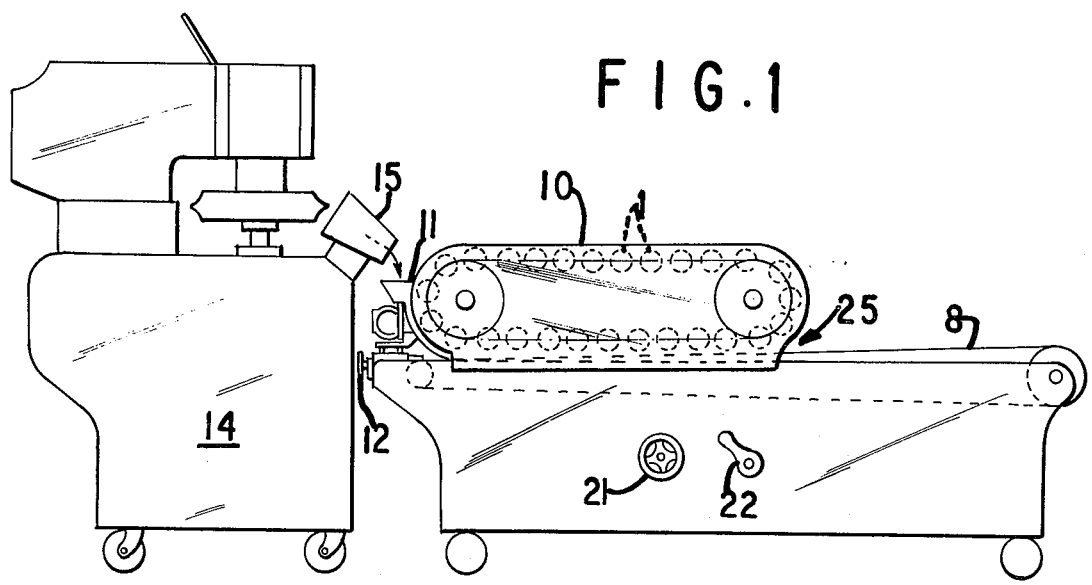

United States Patent [19]

Hayashi

[11] 3,973,895
[45] Aug. 10, 1976

[54] APPARATUS FOR FORMING DOUGH PIECES
[76] Inventor: Torahiko Hayashi, P.O. Box 50, 2-3 Nozawa, Utsunomiya 320, Japan
[22] Filed: Aug. 26, 1974
[21] Appl. No.: 500,701

Related U.S. Application Data
[63] Continuation-in-part of Ser. No. 215,997, Jan. 14, 1972, abandoned.

[52] U.S. Cl. .................... 425/372; 425/92; 425/101; 425/230; 425/373; 425/517
[51] Int. Cl.² .......................................... A21C 3/02
[58] Field of Search ............ 425/335, 337, 371–373, 425/230, 232

[56] References Cited
UNITED STATES PATENTS
1,134,970  4/1915  Lawrence ...................... 425/337
3,191,553  6/1965  Rich et al. ..................... 425/373

FOREIGN PATENTS OR APPLICATIONS
23,998  10/1910  United Kingdom ............... 425/372

Primary Examiner—Francis S. Husar
Assistant Examiner—David S. Safran
Attorney, Agent, or Firm—Guy W. Shoup

[57] ABSTRACT

An apparatus and method for forming dough and dough pieces to a thickness of as little as 1 mm. The apparatus generally comprises a plurality of powered externally rotated rollers spaced above a plurality of moving conveyor belts. The dough is pressed and stretched without breaking by the action of said rollers and said conveyor belts.

5 Claims, 11 Drawing Figures

APPARATUS FOR FORMING DOUGH PIECES

This application is a continuation-in-part of application Ser. No. 215,997, filed Jan. 14, 1972, and now abandoned.

This invention relates to an apparatus for stretching and forming dough and dough pieces for cakes, bread and the like, characterized by its high dough flattening effect and the little likelihood of such dough adhering to the rollers, as compared to conventional apparatus for rolling dough. The present invention also relates to an apparatus for forming moldable materials into various shapes. Additionally, the present invention relates to an apparatus for multiple uses designed to form moldable materials, such as divided dough pieces such as bread dough and doughnuts, with or without fillings, into a multilayered structure, flat sheets or cylindrical bodies by changing the relative velocities of the moving parts of the device and positively controlling their rotational speeds.

The present invention concerns itself with a device for stretching dough for cakes, etc., characterized in that the device comprises a plurality of rotatable rollers carried by chains, said rollers being operated along one elliptical path by the sprockets and chains, a plurality of conveyor belts of different speed arranged in series facing a straight portion of the above elliptical path, and means attached to the housing of the device to engage said rotatable rollers, thus causing them to conduct controlled rotation. Rotating brushes may also be provided between said conveyor belts and pendent brushes may be provided between each of said rollers.

This invention is an improvement over prior art dough rolling apparatus. Examples of such apparatus appear in U.S. Pat. Nos. 1,134,970 and 3,191,553. In devices such as therein illustrated, the rollers contacting the dough are freely rotatable and such rollers will tend to break dough, whereas in the present invention the braking action on the rollers provided by positively controlling the rotational speed of the rollers does not break the dough and provides an improved product. Further, the dough product is subjected to positive pressures by the rollers whose rotational speed is positively controlled, on conveyor belts of at least two speeds, the downstream conveyor always having a higher speed.

Additionally, in the past, methods for preparing a multilayered product containing layers of dough consisted of preparing a pair of stretched dough layers, placing fillings between the layers, folding the overlapped pair of dough layers containing a sandwiched layer of fillings into three folds, stretching the folded material with a roller, and then repeating, several times, the procedure of stretching and folding. Forming dough material into other shapes such as cylindrical bodies and sheets was also performed by manual operation for most of the processing stages. Such processes require a great deal of labor and time, thus increasing the cost of the products. The present invention resolves the above difficulties by providing an improved device which enables production of multilayered, cylindrical or sheet-form products automatically and with simple mechanical operations.

The present invention provides a multiple-use roller device for forming dough pieces comprising a conveyor belt and a plurality of rollers aligned in parallel with each other and spaced apart upwardly from said conveyor belt with their axes at right angles to the direction of movement of said conveyor belt, and moving in the same direction as the movement of said conveyor belt, whereby the velocity of the movement of said conveyor belt and the velocity of movement of said aligned rollers may be adjusted relative to each other to obtain the desired products.

Also, the peripheral rotational velocity of each of said aligned rollers may be adjusted relative to each other to obtain the desired products. Said aligned rollers may be connected to each other by means of a pair of endless chain belts holding on both ends of each roller so that the rollers may revolve along with the rotation of the chain belts.

When dough or dough pieces are fed continuously at certain intervals into the space between the conveyor belt and the aligned rollers at the intake station, the device produces a dough or multilayered dough product provided that the movement of said aligned rollers is in the same direction as that of said conveyor belt and the rotation of each said roller is clockwise when the conveyor belt moves from left to right and that the relative velocity of each component of the device is set so as to satisfy the formulae:

$$a > b, c \leq a - b$$

wherein $a$ is the velocity of the movement of the aligned rollers, $b$ is the velocity of the movement of the conveyor belt and $c$ is the peripheral rotational velocity of each roller.

The number of layers of the product can be freely adjusted by the manipulation of the relative velocities of the components and the feeding speed of the dough materials fed into the device.

When dough pieces are fed at a longer interval so that adjacent pieces do not overlap each other, flattened sheets of dough are obtained by the device operated in the same relative directions and at the same relative velocities of the components as the case of the production of multilayered dough products.

In order to produce cylindrical bodies from the fed dough pieces, the velocities of the components are changed so as to satisfy the formulae:

$$a < b, c = b - a$$

wherein $a$, $b$ and $c$ are defined in the same manner as above.

Figure 2:
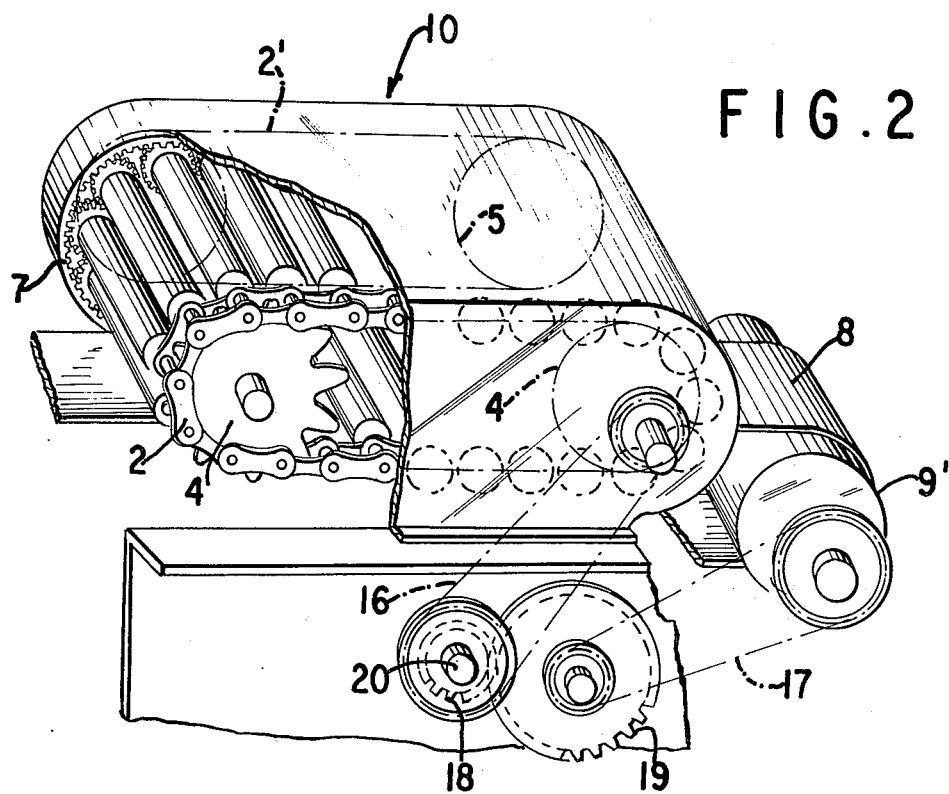
Figure 3:
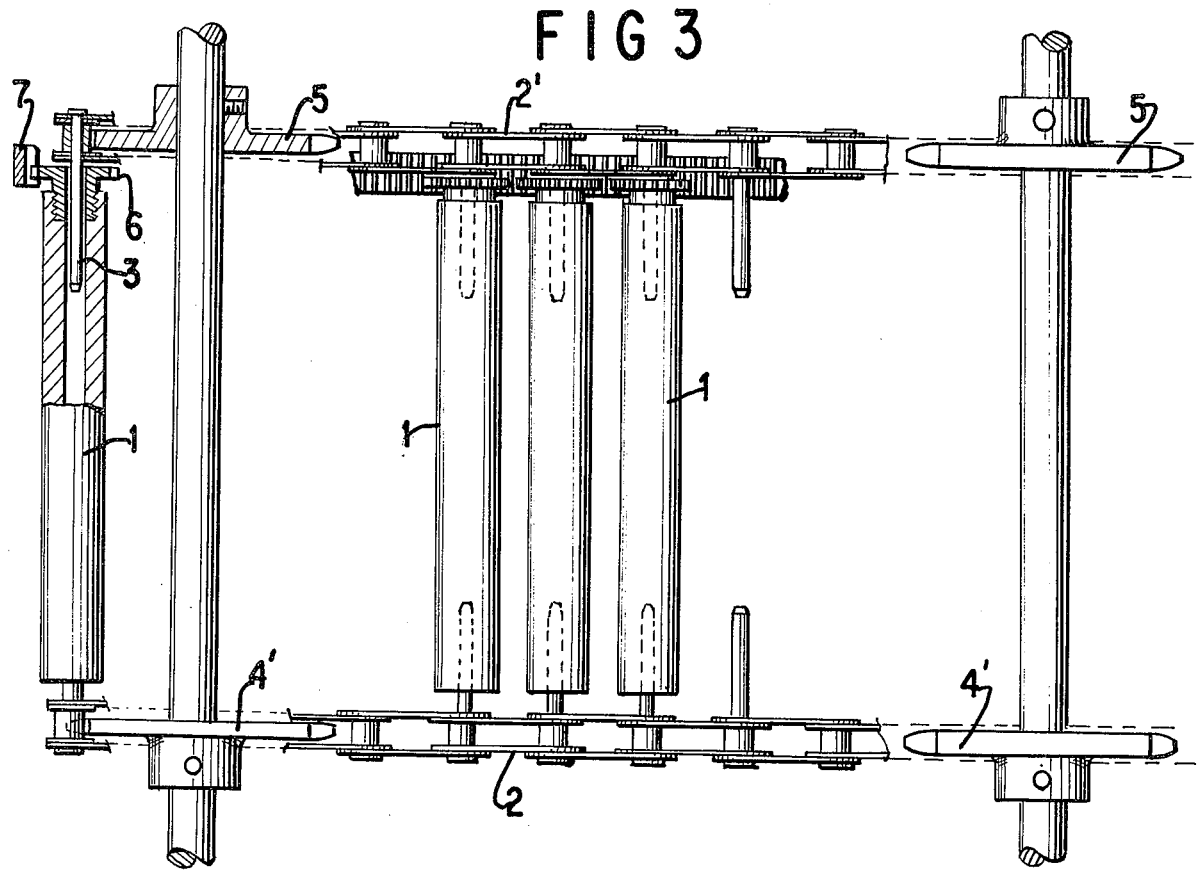
Figure 4:
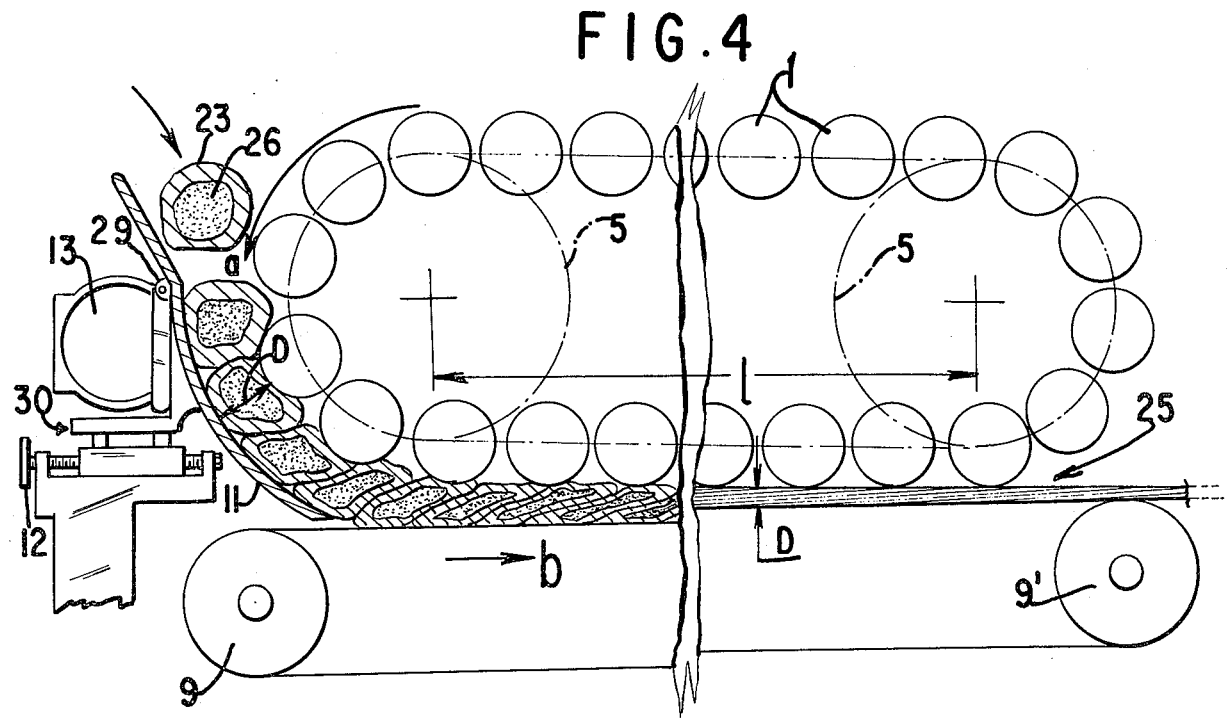
Figure 5:
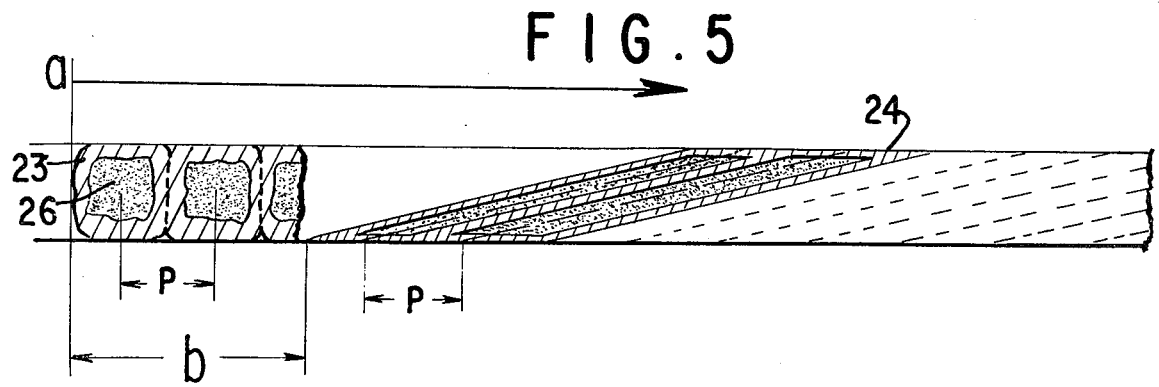
Figure 6:
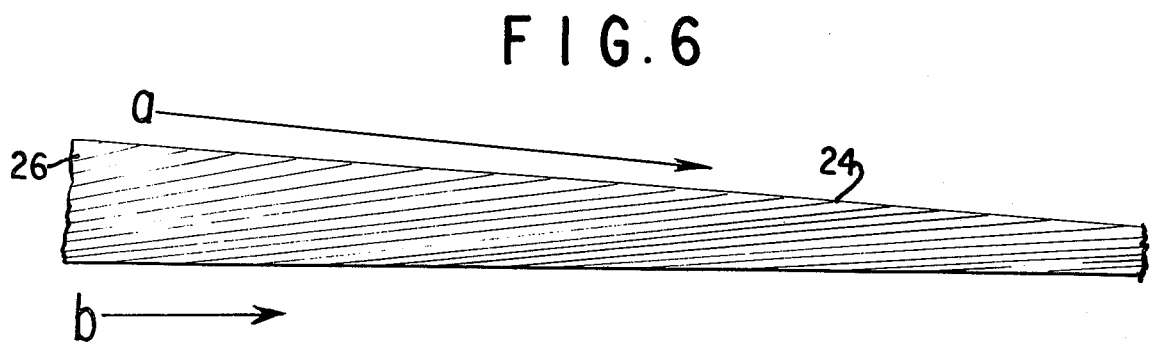
Figure 7:
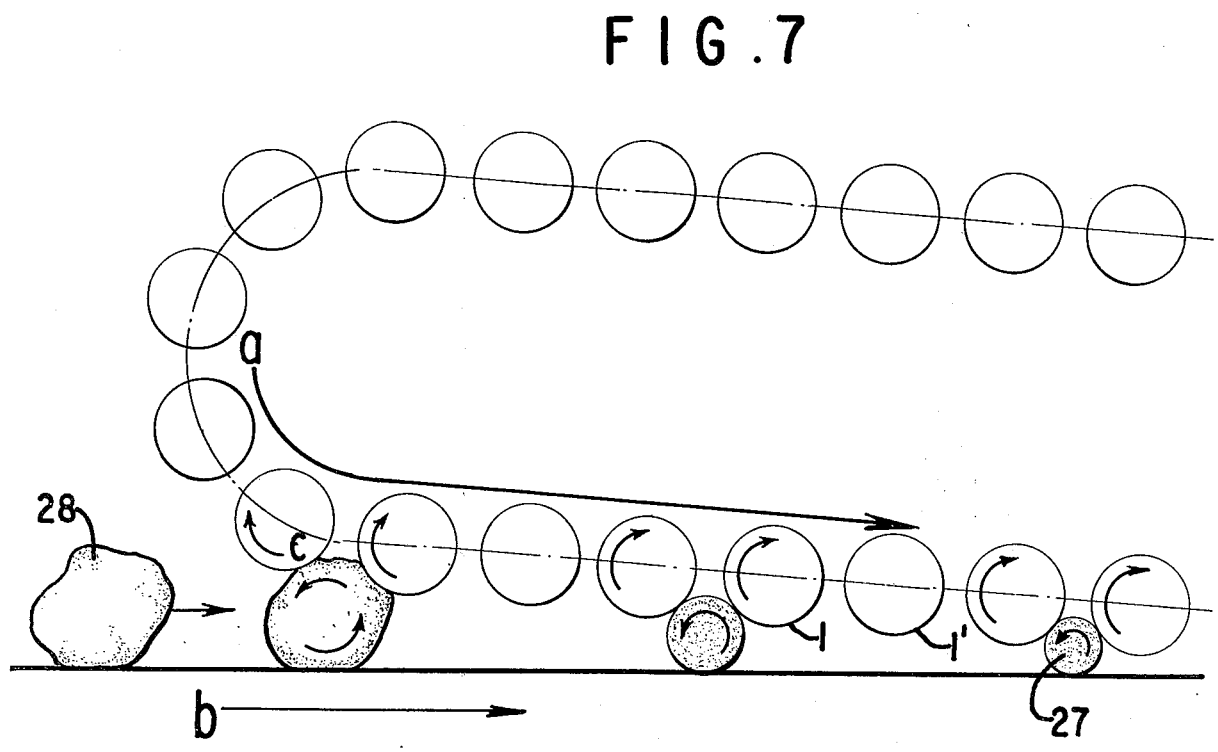
Figure 8:
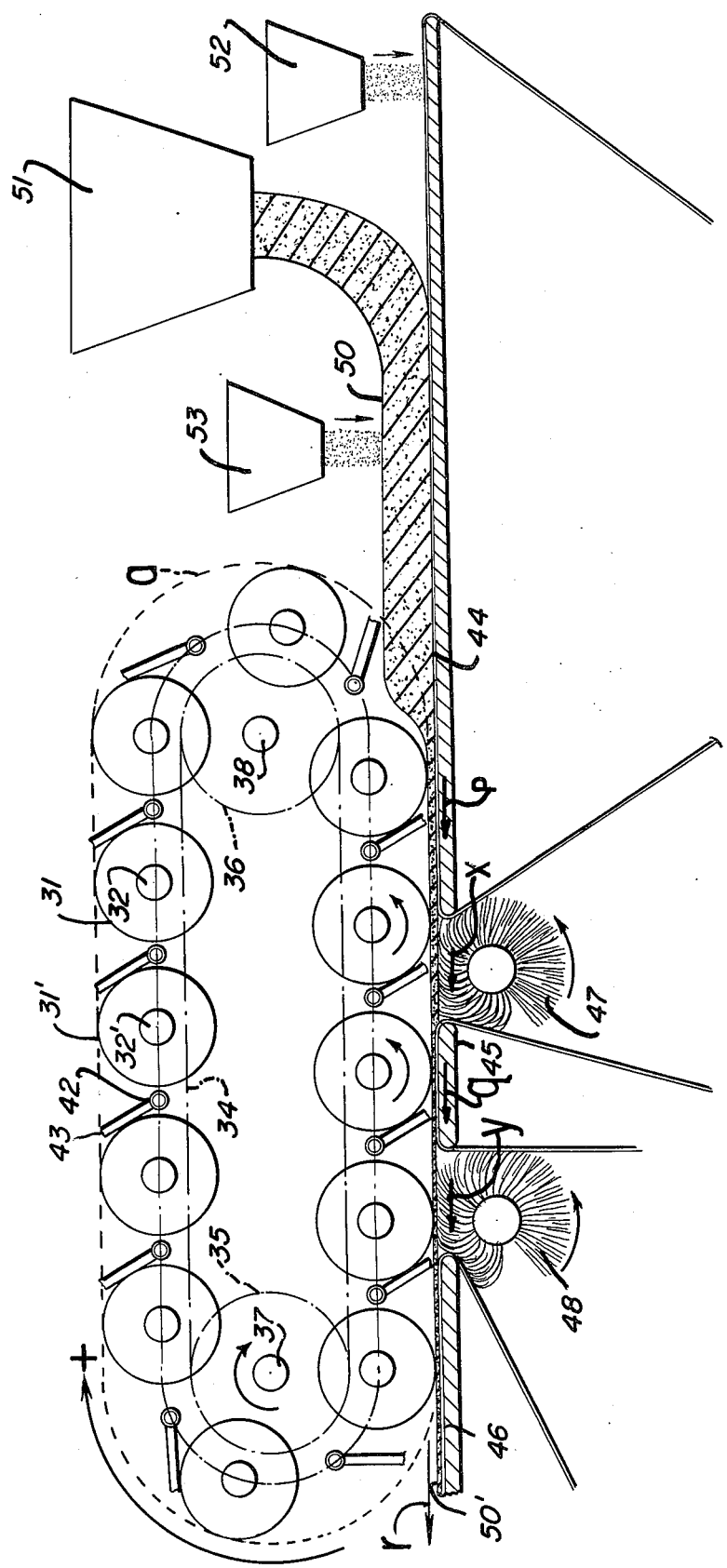
Figure 9:
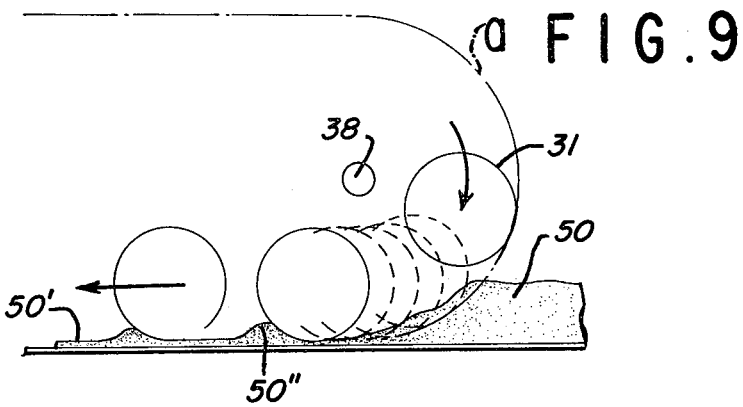
Figure 10:
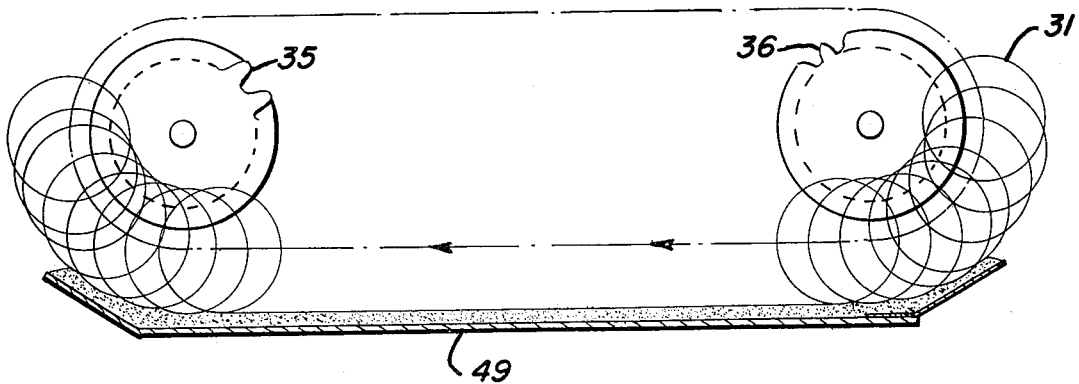
Figure 11:
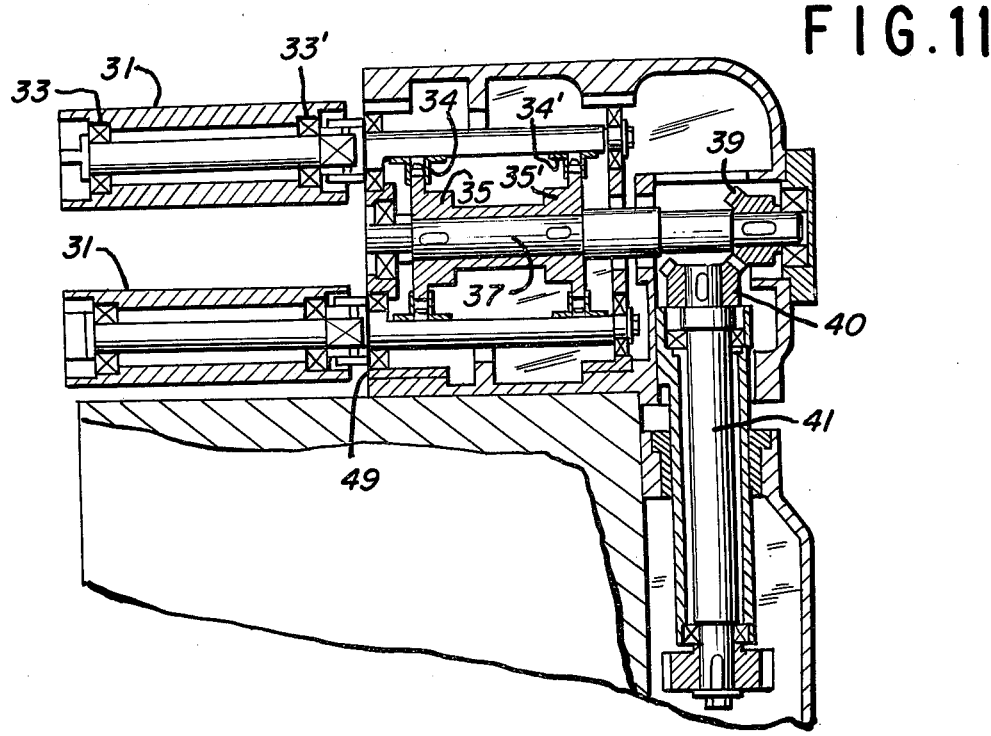

A brief description of the drawings is as follows:

FIG. 1 is a side view of an embodiment of the present invention,

FIG. 2 is a partially broken away perspective view of a portion of the device in FIG. 1, FIG. 3 is a top view of a portion of the device in FIG. 1 indicating the positional relationship of the components, FIGS. 4 and 7 are diagrammatical views illustrating the movements of the components and the forms of dough materials being formed into a multilayered structure and cylindrical bodies respectively, FIGS. 5 and 6 are diagrammatical views illustrating the formation of multilayered structures, FIG. 8 is a diagrammatical view of the preferred embodiment, FIGS. 9 and 10 are diagrammatic views of movements of certain of the components, and FIG. 11 is a cross-sectional view of the drive mechanism for FIG. 8.

Referring now particularly to FIGS. 8–11, which show a preferred embodiment of the invention, roller 31 is mounted by means of bearings 33 and 33' around the shaft 32. A housing for the rollers may be mounted to a base in any conventional way, such as is shown in FIGS. 1 and 2.

An endless chain 34 is entrained around two sprockets, i.e., drive sprocket 35 and tension sprocket 36, spaced apart from each other on a horizontal plane, and is operated along an elliptical orbit containing a lower straight portion. An additional endless chain 34', drive sprocket 35' and tension sprocket 36' not shown are provided parallel to endless chain 34 and its drive sprocket and tension sprocket. Drive sprockets 35 and 35' have drive shaft 37 in common, and the tension sprockets 36 and 36' have tension shaft 38 in common. At one end of drive shaft 37 is provided bevel gear 39 which engages bevel gear 40. Shaft 41 of bevel gear 40 serves as the input shaft for this apparatus. Shaft 41 may be powered by any conventional apparatus. The parallel chains 34 and 34' carry one section of roller shaft 32; another section of roll shaft 32 carries roller 31.

A first conveyor 44, a second conveyor belt 45 and a third conveyor belt 46 are disposed in series facing the lower straight portion of the elliptical orbit along which is guided roller 31 by chains 34 and 34'. The upper flights of these conveyor belts travel in the direction shown by the arrows $p$, $q$ and $r$ respectively, and are moved by any conventional apparatus. Brush rollers 47 and 48 may be arranged between the first conveyor belt 44 and the second conveyor belt 45, and between the second conveyor belt 45 and the third conveyor belt 46, respectively, and are rotated by any conventional means in the direction shown by arrows $m$ and $n$.

As shown in FIGS. 10 and 11, a rail 49 is disposed at a position along the lower straight portion of the elliptical orbit such that it engages a portion of the outer cylindrical surface of roller 31 near one end thereof so as not to obstruct the passage of the dough between the straight portion of the elliptical orbit a of roller 31 and the conveyor belts 44, 45 and 46, and along the passageway of the dough. The rail is attached to a base for the apparatus by any conventional means, such as bolts or welding. When roller 31 engages rail 49, the latter positively controls the rotational velocity of the former by friction therebetween. Both axial ends of rail 49 are preferably bent somewhat upwardly. The forward bent portion engages and starts to drive roller 31 somewhat before roller 31 enters the straight orbit portion facing the first conveyor belt 44, and the rearward end portion of rail 49 ceases to engage and drive roller 33 somewhat after roller 31 leaves the straight orbit portion facing the third conveyor belt 46, after completion of progress along the straight orbit portion. This provides highly favorable effects on dough molding.

A plurality of roller shafts 32 are arranged around the periphery of the elliptical orbit. Brush shafts 42 may be carried between roller shaft 32 and its adjacent roller shaft 32' by chains 34 and 34' in the same manner as in the case of roller shaft 32. On brush shafts 42 are rotatably mounted pendent brushes 43, as shown in FIG. 8.

The dough for cakes, bread, etc., is represented by 50, having undergone preliminary stretching by a device not shown herein. 50' is the flattened dough, and 51 is the hopper from which the dough mass 50 is extracted. 52 is a flour dusting device for distributing dusting flour over the first conveyor belt, and 53 is also a flour dusting device for distributing dusting flour over the dough supplied to the device.

The velocity of the revolution of roller 31 and the operating speeds of the first, second and third belt conveyors are represented as $t$, $p$, $q$ and $r$ respectively. The velocity of movement of the flattened portions of the brush which result as the dough passes over rotating first and second brush rollers, flexing the brush thereof, are represented as $x$ and $y$ respectively. The relative values of these are: $t > r\ 22\ y > q > x > p$.

Each of $x$ and $y$ varies in different stages. Thus, the speeds involved are set as follows:

$$x' \leq q, y' \leq r \text{ and } x'' \geq p\ y'' \geq q$$

wherein $x'$ and $y'$ represent the peripheral speeds of the brush hairs when they are not subjected to flexion, and $x''$ and $y''$, those of the brush hairs when they are most flexed.

Since the roller 31 revolving along orbit a engages rail 49 and starts rotation somewhat before it starts straight forward movement along the lower straight portion of the elliptical orbit, when the dough 50 is supplied onto the conveyor belt 44, roller 31 contacts dough 50 only after the roller starts controlled rotation.

By utilizing the device of the present invention, soft dough, such as that for cookies, uncohesive dough, made by kneading water containing flour with lumps of butter dispersed therein, such as that for pies, or heterogeneous dough, which is uneven in its adhesiveness in its various parts, all can be stretched to a thinness of about 1.5 mm. This stretching to such thinness, which has hitherto been unknown, is here made possible by roller 31 being positively rotated on its shaft as the roller moves along its orbit, i.e., rotation on roller 31 as the roll engages rail 49. As can be seen from the above, this rotation actually is not caused by the engagement with the dough on the belt conveyor in progress. The roller exerts along its circumference an arresting force against the dough in the direction opposite so that of the progress of the dough, thereby preventing the dough from breaking, which breaking would occur if the dough was merely stretched forward by a roller whose rotation was not restrained by the rail 49. The revolution speed $t$ of roller 31 is always greater than the speed of progress of dough 50. Thus, roller 31, pressed into dough 50, would form a bulge 50'' of dough in front of it, but since the portion where bulge 50'' is apt to be formed is conveyed downstream at the speed $t$, such bulge apt to be formed is thinned out through the rotation of roller 31, and the combined action of conveyor belts 44, 45 and 46 of various speeds. Further, brush rollers 47 and 48, if present, may also cooperate in that combined action.

The mechanism for conveying the dough comprises the members 44, 47, 45, 48 and 46, arranged in this sequence, the speed of each of these members being greater than that of the preceding member in the same sequence. By this mechanism, bulge 50'', apt to be formed on the first conveyor belt 44 is levelled by the second conveyor belt 45 pulling it forward; and, when present, the circumferential hairs of intermediate brush roller 47 assists such levelling by soft contact.

In this setting, roller 31 rotates and progresses over the dough 50. In case the dough is too strongly pressed, it will adhere to the roller. Thus, in stretching the dough, it is preferable that a pulling force be exerted in addition to a pressing force. However, if the pulling force is too strong, the dough will break. Thus, in accordance with this invention, the circumferential speed of the rotation of roller 31 is positively regulated by friction with fixed rail 49, and is set somewhat less than that of the stretching of the dough, maintaining a balance between pulling and pressing, and prevents the dough from breaking.

The more conveying members, e.g., brush rollers 48, second conveyor belt 45, and the third conveyor belt 46, etc., that are combined in the conveyor system, where the speed of each member is greater than that of the preceding upstream member, the more safely and thinly can the fragile dough be stretched.

If soft brush rollers 47, 48, etc., are arranged between the conveyor belts, dusting flour is transferred from a preceding conveyor belt onto a subsequent conveyor belt without substantial loss. This is accomplished by disposing the circumference of the brush roller so as to contact it with the downstream end of the first conveyor belt and the upstream end of the second conveyor belt. Additionally, the dispersion of the dust flour on the lower surface of the dough being stretched (i.e., the surface which was contacted by the conveyor belt) is levelled.

If brushes 43 are employed, their function and effect is to distribute the dusting flour continuously and evenly on the dough 50 being stretched, thus preventing the dough from adhering to roller 31.

A further embodiment of the invention is shown by FIGS. 1–7. Many rollers 1 of the same size are aligned at regular intervals so as to form a continuous endless assembly in a substantially elliptical form. The rollers 1 are mounted to endless chains 2, 2' running adjacent to both ends of all of the aligned rollers 1 at right angles to the axis of each roller, as illustrated in FIG. 3, by means of shafts 3 fixed in each joint of the chains 2, 2' and extending inwardly from said chains into the hollow portion of each roller 1. The rollers 1 are rotatable around the shaft 3. The chains 2, 2' are mounted on sprockets 4, 4' and 5, 5' at the forward and rear ends of the aligned roller assembly.

One end of each of the rollers 1 is equipped with a gear 6, which meshes with a rack gear 7 positioned adjacent to the chain 2' around the periphery of the aligned roller assembly. The rack gear 7 imparts rotational movement to the rollers 1 through the gears 6, the velocity of said rotational movement being determined by the velocity of movement of the chains 2, 2' and the sizes of the gears 6 and the corresponding rack gear 7. An endless conveyor belt 8 is arranged to pass around two rollers 9, 9' placed horizontally spaced apart.

The housing 10 encases the rollers 1, the chains 2, 2', the sprockets 4, 4', 5, 5' and the rack gear 7. There are openings in the forward end and the bottom of the housing 10, and the outer surfaces of the rollers 1 adjacent to the openings are exposed to the outside. A material feed guide 11 is positioned in front of the forward opening of the housing 10 at certain distances D from the orbit of the outermost surfaces of the rollers 1. The distances D are adjustable by the operation of the knob 12 mounted on the guide position adjusting device 30. The distance D may also be adjusted by turning the guide 11 around the hinge 29 which connects a member of the guide position adjusting device 30 and the guide 11. When the guide 11 is turned around the hinge 29 so as to elevate the lower portion of the guide 11, the distances D are further constricted. The distance D between the rollers and the belt can be freely adjusted.

A vibrator 13 is positioned adjacent to the guide 11 in order to prevent materials from sticking to or being arrested by the guide 11 when the materials are fed into the device. The guide 11 is continuously vibrated by the vibrator 13 at an amplitude of vibration of 5 mm. or less and at 2,000 or more vibrations per minute.

Dough pieces are supplied from the discharge duct 15 of the machine 14, which divides and forms dough for bread, doughnuts and the like into a ball shape of a certain size or encrusts cooked meat or vegetable or such food material as jam and fat with dough so as to produce ball-shaped dough pieces with fillings. FIG. 4 illustrates in cross-section ball-shaped dough pieces 23 with fillings 26 fed continuously from above the guide 11 and piled up between the guide 11 and the rollers 1.

The kinetic relationship between the rollers 1 and the belt 8 is explained hereinafter. The arrow $a$ indicates the direction of movement of the chains 2, 2', and consequently the direction of orbital movement of the rollers 1. The arrow $b$ indicates the direction of movement of the belt 8. The arrow $c$ indicates the direction of rotation of the rollers 1. The rollers are rotated while they revolve along the elliptical orbit. The belt 8 runs in the same direction as the movement of the rollers in the bottom position of the orbit.

The velocities of the orbital movement of the rollers, the rotation of the rollers and the movement of the belt are arranged to be in a certain relationship by means of gears 6, 7, 18, 19 and chains 16, 17. The chain 16 is placed on a gear fixedly and concentrically connected to the sprocket 4' and a gear 18 mounted at an appropriate position on a vertical frame underneath the gear adjacent to the sprocket 4'. The chain 17 is placed on a gear fixedly and concentrically connected to one end of the roller 9' and a gear 19 mounted adjacent to the gear 18 in a meshing relationship with the latter.

The chain 16 causes the sprockets 4', 5' to rotate so as to impart revolution to the chains 2, 2'. The chain 17 causes the roller 9' to rotate so as to impart rotation to the belt 8. Thus, the ratio of velocity of the chains 2, 2' against the velocity of the belt 8 ($a : b$) can be adjusted by changing the numbers of teeth of the gear 18 and the gear 19. The rotation of the gear 18 is imparted by a variable speed gear connected to the shaft 20 of the gear 18. The variable speed gear is operated by the handle 21 for the variable speed gear mounted on the outer surface of the casing for the conveyor belt 8. The velocity ratio between the orbital movement of the rollers 1 and the movement of the belt ($a : b$) is changed by the clutch 22 positioned near the handle 21 on the outer surface of the casing for the belt 8.

The velocity relationhip of the components can be set in various ways to obtain products of different shapes. If the velocities of the movements $a$, $b$ and $c$ are set to satisfy the requirements:

$$A > b, a - b > c$$

wherein $a$ is preferably 5 times or more $b$ and $c$ is the peripheral rotational velocity of the rollers 1, and materials 23 are fed to the space D in such a manner that they are stacked up, a band-form material 24 comes out continuously from the outlet 25 at the opposite end of the intake. In this material 24, the fillings 26 wrapped up in dough as lumps before being fed into the device are now positioned between the layers of dough as a plurality of thin flat layers. The product is ready for further processing for pies and Danish pastries.

The multiple-layer structure is produced, as illustrated in FIGS. 4, 5 and 6, as a result of scalelike overlapping of materials flattened out between the belt and the rollers at a certain velocity relationship. The velocity of movement $a$ of the rollers 1 being greater than the velocity of movements $b$ of the belt 8 causes the upper portion of the material coming into contact with the rollers 1 to stretch to a further distance than the lower portion of the material nearer to the belt 8.

The locus of the movement of the rollers 11 gets gradually nearer to the belt 8, thus reducing the distance $d$ increasingly. This fact causes the surfaces of the rollers 1 to exert a constance pressure upon the upper surface of the material, and also creates an effect whereby the inclinations of layers are gradually levelled off.

The numbers of layers of the product can be adjusted by adjusting the length of the zone $l$ where the rollers 1 and the belt 8 run facing each other. The longer the distance, the more the layers formed. More layers can also be produced if the value of $a/b$ is larger. Again, the larger the value of $(a-b)/c$, the more the number of layers. The easier and thus more practical means for the adjustment of the number of layers in many cases might be to change the velocity of the belt 8 relative to the feeding speed of materials, or to change the gap D between the guide 11 and the rollers 1. The change of the velocity of the belt 8 relative to the feeding speed of materials can be materialized by adjusting the interval of feeding of materials or the distance between the centers of the adjacent dough pieces hereinafter referred to as the "pitch", or by changing the velocity of the belt 8 by means of the handle 21 of the variable speed gear. The change in the dimension of the gap D is effective for adjusting the number of layers because the nearer the inner surface of the guide 11 to the rollers 1 the more easily the materials are effected by the movements of the rollers 1, and consequently the pitch P of the materials becomes shortened. If there was no guide 11, the minimum pitch P of the materials placed on the belt 8 should be equal to the diameter of each material fed from the material supply device 14. The pitch P, however, can be reduced forcibly by the action of the guide 11. The adjustment of the guide 11 is operated in two ways. First, the operation of the knob 12 on the device 30 causes the guide 11 to move horizontally towards or away from the rollers 1. Second, when the guide 11 is turned around the hinge 29 and the lower portions of the guide 11 are elevated, gap D is more constricted towards the belt 8 and thus materials 23 are more easily affected by the action of the rollers 1.

An experiment was conducted with spherical bread dough pieces 23 having a diameter of 60 mm. containing lumps of butter as fillings. The length of the press zone $l$ was set at 1 m. The feeding speed of the materials was one piece per second. The gap D was set at 35 mm. The velocity of the belt 8 was 30 mm. per second. The velocity ratio between the revolution of the rollers, the movement of the belt and the rotation of each roller was set at 10 : 1 : 5. The resultant product was a continuous belt of the material containing about 45 horizontal layers of butter.

Another experiment was conducted using the same requirements as the above experiment except that the gap D was 50 mm. and the velocity of the belt 8 was 50 mm. per second. The product obtained was a continuous belt of the material containing about three layers of butter.

The inventor has explained hereinabove the use of the device to obtain a multilayered product. The second usage of the device is for the production of a separate cylindrical body 27 from each dough piece fed into the device (see FIGS. 7 and 9). For this purpose, the relationship between $a$, $b$ and $c$ must satisfy the formulae:

$$b > a, b - a = c$$

In case the friction between the material and the rollers 1 and the friction between the material and the belt 8 are exactly the same, the second of the above formulae might be expressed as $b - a = c$. As an example of the application of the above formulae, the ratios of the value of $a$ against $b$ may be made by the operation of the clutch 22 to be 10 : 15, and consequently $a : b : c$ may be substantially 10 : 15 : 5.

In the above instance, the distance of the gap D may be made to be larger than the diameter of each dough piece 28. Preferably the guide 11 may be removed. The velocity of the belt 8 should be high enough so that no pair of the leading material and the trailing material come into contact with each other. As illustrated in FIG. 7, a material 28 without filling is transported upon the belt 8 while arrested between adjacent rollers 1, 1' and formed eventually into a cylindrical body 27 of a small diameter.

Alternatively, a material 23 or 28 fed into the device may be individually flattened by using the following formulae:

$$a > b, c < a - b$$

and by making the pitch P large enough so that no neighboring dough pieces come into contact with each other.

With respect to the first embodiment described hereinabove, the speeds of movements of the various conveyor belts and movements can be achieved by the use of conventional clutches, meshed gears and variable speed gears.

I claim:

1. Apparatus for continuously stretching bread dough or forming moldable material, comprising
    a base,
    a plurality of rollers spread apart and rotatably positioned on said base in an elliptical path,
    a plurality of conveyor belts below said rollers arranged in series and facing the lower portion of said elliptical path,
    means operatively associated with said conveyor belts to rotate said conveyor belts relative to said base, the speed of each of said conveyor belts being faster than that of the nearest upstream conveyor,
    means connected to said base to move said rollers in the same direction as the movement of said conveyor belts,
    and means connected to said base to positively control the rotational speed of said rollers independently of the speed of each of said conveyor belts.

2. Apparatus according to claim 1
    wherein the means to positively control the rotational speed of said rollers comprises a guide rail which engages and is operatively associated with said rotatable rollers prior to their contact with said dough.

3. Apparatus according to claim 2,
wherein the means to positively control the rotational speed of said rollers comprises
a gear fixed to an end of each said roller, and
a rack gear positioned along the locus defined by the path of travel of said rollers and in mesh with said gears fixed on said rollers.

4. Apparatus as in claim 1, including brush rollers between a first and a second of said conveyor belts.

5. Apparatus for continuously stretching bread dough of forming moldable material, comprising
a base,
a plurality of rollers spread apart and rotatably positioned on said base in an elliptical path,
a first conveyor belt below said rollers facing the lower portion of said elliptical path,
a second conveyor belt located upstream of said first conveyor belt,
means in operative relationship with said first conveyor belt to rotate said conveyor belt relative to said base, the speed of said first conveyor belt being faster than that of the said second conveyor,
means connected to said base to move said rollers in the same direction as the movement of said conveyor belt
and means connected to said base to positively control the rotational speed of said rollers independently of the speed of said conveyor belt.

* * * * *